UNITED STATES PATENT OFFICE.

CARL S. MINER, OF CHICAGO, ILLINOIS, ASSIGNOR TO QUAKER OATS COMPANY, OF CHICAGO, ILLINOIS, A CORPORATION OF NEW JERSEY.

ALIMENTARY PASTE.

1,349,524.

Specification of Letters Patent.   Patented Aug. 10, 1920.

No Drawing.   Application filed July 9, 1920. Serial No. 394,902.

*To all whom it may concern:*

Be it known that I, CARL S. MINER, a citizen of the United States, residing at Chicago, in the county of Cook and State of Illinois, have invented new and useful Improvements in Alimentary Pastes, of which the following is a full, clear, concise, and exact description.

My invention relates to an improved food product that is nutritively balanced by including in the admixture thereof those constituents in which the modern diet is likely to be deficient, namely, complete protein, lime, vitamins, etc.

My invention relates particularly to food products of the above indicated character that may be economically manufactured to produce a substantially uniform product that may be placed in merchandizing packages and thereafter may be preserved for future use without becoming moldy or deteriorating in quality.

My invention has special reference to food products known as alimentary pastes and specifically as macaroni, spaghetti, noodles, and the like. But it is to be understood that I do not desire to be limited to food products of this specific designation only, inasmuch as my invention contemplates the provision of a food product or food composition that comprises a desirable portion of butter fat associated with other desirable food constituents so as to balance nutritively the food composition. Moreover, while my food composition comprises these desirable constituents, such as complete protein and vitamins, it does not deteriorate in quality with time which permits of its being packaged and widely distributed commercially. Again, by means of my present invention a food product of substantially uniform quality may be provided which is capable of being economically produced in large quantities.

Heretofore in the manufacture of commercial food products known as alimentary pastes, it has been the custom to mix a coarsely ground wheat flour, known as semolina, with a relatively small amount of water, this mixture being kneaded thoroughly to form a very stiff mass of doughy constituency. This mass of flour and water was subsequently forced through dies of various sizes by means of pressing rams to form macaroni, noodles, spaghetti and other allied food products of the trade. The material after passing through the aforementioned dies is damp throughout its body and it is necessary, therefore, to slowly dry it artificially under properly controlled heating conditions until the percentage of water or moisture contained therein is reduced to a merchantable content which will subsequently preclude the finished food products from molding, particularly after they have been placed in merchandizing packages and stored for a short time.

In food products, as they relate to alimentary pastes, it is the custom of the trade, in accordance with the regulations established under the Federal food laws, to limit the moisture content of such food products, as are indicated above, to not more than thirteen and one half per cent. Should the moisture content appreciably exceed this value it is likely that, under ordinary circumstances, such food products will readily mold or otherwise deteriorate, thereby rendering them entirely unsuitable for sale or for use.

The common form of alimentary pastes heretofore marketed contained only semolina or wheat flour and water. It has been proposed to add milk to the foregoing composition which milk is preferably in the form of a desiccated powder. The milk powder thus added may be made from skimmed milk from which the butter fat has been substantially extracted. In this form, however, it will be appreciated that the milk content is lacking in very desirable nutritive components. Again, it has been suggested that milk powder made from whole milk comprising butter fat may be added to the mixture of semolina of wheat and water. The milk content added in this form, however, becomes rancid very rapidly and therefore precludes the food product from being merchantable because of its rapid deterioration in quality.

As a consequence, it becomes highly desirable to provide a food product that is capable of being preserved for an indefinite period so that it may be merchandized, this food product to comprise those constituents which are necessary or desirable from the nutrition point. The desirability of comprising a milk content in a food composition of the character indicated above is due to the fact that modern research has revealed that milk is the best source available for complete protein, lime, and vitamin constituents in which a diet is likely to be deficient.

In producing food products embodying these desirable characteristics, the commercial phase dictates that a food composition comprising a milk content shall be appetizing which, in turn, requires that the quality thereof remain permanently good. However, it is known that milk rapidly deteriorates in quality, which fact has heretofore precluded its use as a constituent in alimentary pastes.

By my present invention, I am able to use a milk content in food compositions, such as alimentary pastes, which insures that the compositions do not deteriorate in quality and, at the same time, contain those nutritive values which are imparted only by whole milk. This problem is solved in part by the use of milk in desiccated form mixed with various other food materials to produce combinations desirable both from the standpoint of palatability and nutritive value. When desiccated skimmed milk is used desirable results are obtained but the food product lacks that very important vitamin constituent which occurs in milk fat and is known as fat soluble A. This vitamin constituent is one that is highly important and probably essential for growth and reproduction—certainly necessary for the highest degree of physiological development. Since skimmed milk has had its butter-fat content removed, as completely as is practical from a commercial standpoint, it follows that foods which comprise desiccated skimmed milk do not have that full measure of nutritive excellence which is attained when desiccated whole milk is used. Yet desiccated whole milk, because of its pronounced tendency to deteriorate in quality and to become rancid, is very difficult to embody in a food composition having permanent keeping qualities which are desirable for a food product that is to be merchandized economically.

Because of the tendency of desiccated whole milk to become rancid, the milk containing foods now in general use, such for example as pancake flour, comprise desiccated skimmed milk only, and therefore, are deficient in those qualities which a milk containing food should have. This deficiency of skimmed-milk food products is recognized under the Federal pure food laws which require that food products comprising skimmed milk contents only must be labeled as skimmed-milk products. It is also obvious that none of the food products, even alimentary pastes in which a skimmed milk content only is comprised, has a well balanced food or nutritive value because of the lack of vitamin content which results from the absence of any butter-fat.

While I appreciated that it would be highly desirable to produce a food product such as an alimentary paste and specifically macaroni, by adding whole milk or whole milk powder to the semolina and water, I recognized that the butter-fat constituent present in the whole milk would become rancid as always occurs when fat is subject to the action of light, heat and moisture. By the usual methods of proportioning the various constituents, I was not able in this fashion to produce a food product having the desired nutritive values and, at the same time, possessing permanent keeping qualities.

While skimmed milk powder might be substituted for the above whole milk content and thereby preclude the food product from becoming rancid, this substitution would be deficient from the nutritive standpoint because of the low and almost vanishing content of the vitamin known as fat soluble A which is a constituent comprised in butter-fat, the latter being present in suitable quantity only in whole milk powder or whole milk.

While the fat content or the fat soluble A content is present in desirable quantities in the foregoing composition comprising the whole milk, it is my belief that it was there in excess so that the globules of the butter fat were not so completely covered by the dough formed by the semolina and water that they were adequately protected from light and air to prevent the fat from becoming rancid when in the presence of such a water content as is desirable to keep the alimentary product or macaroni from becoming excessively brittle.

I, therefore, propose to proportion the vitamin content or the fat soluble A content in a food composition, such as is covered by my present invention, to such a value that the food product, in addition to being nutritively balanced as regards lime, complete protein, vitamins and the like, will contain such a proportion only of fat content that the fat globules will be sufficiently coated by the dough mixture to preclude them from becoming rancid. Of course, it may be desirable to saturate the dough mixture with fat globules but not beyond the point where all the fat present will be sufficiently occluded in the dough to preclude rancidification thereof. Again, the protein content should be balanced and proportioned in such manner that, while there is sufficient skim-milk powder present to keep the fat content within the desired limits, the total amount of skim-milk present will not raise the protein content of the composition as a whole above that required for a suitable nutritive balance.

In accordance with the foregoing, I provide a food product or alimentary paste which comprises the desirable constituents in balanced nutritive proportions that are imparted by whole milk and skim-milk and, at the same time, possesses permanent keeping qualities which render the food product suitable for merchandizing. Again, my food product is of fine texture, agreeable flavor and high nutritive value. In the present food composition I have determined the optimum combination of skimmed milk and whole milk, preferably in desiccated form, which gives to the food product the permanent keeping quality that is required of commercial food products and yet imparts to the same the maximum of the desirable vitamin content, which is contained in the butter fat that, by my invention is precluded from becoming rancid.

I preferably mix with semolina or wheat flour, the desired quantity of desiccated milk powder, this powder being a mixture comprising fifty per cent. of skimmed milk powder and fifty per cent. of whole milk powder. These milk powders are commercial products and are of substantially uniform quality. This mixture of skimmed milk powder and whole milk powder I add to the wheat flour, also adding the desired quantity of water, the whole being thoroughly mixed, kneaded and subsequently passed through dies as is usual in producing alimentary paste products such as macaroni, spaghetti, noodles and the like.

I have found that by making a mixture comprising ninety-six per cent. of semolina of wheat, two per cent. of skimmed milk powder and two per cent. of whole milk powder that I produce an alimentary paste product, and particularly a milk macaroni, which contains nutritively balanced constituents including an appreciable quantity of the vitamin constituent known as fat soluble A and that this product has permanent keeping qualities which insures its being suitable for merchandizing. The water content, as is well known in the industry, should be of such a value that the food products when dried will contain a moisture content substantially not in excess of thirteen and one-half per cent. which is the usual merchantable water content of alimentary paste contents.

I find that the food product of my present invention does not become rancid because I have so adjusted the percentage of butter fat, which is added to the mixture by means of the desiccated milk content, that substantially all of the fat globules of the butter fat are coated by the dough comprising the water and semolina of wheat. Moreover, I have so regulated the butter-fat content that the coating capacity of the dough is utilized in such fashion that, in the finished product, the fat globules are coated with a sufficiently thick layer of semolina paste, which is impervious to air and light, that the product is substantially precluded from becoming rancid. This is shown experimentally by the fact that milk macaroni, made in accordance with my invention, gives up to the ordinary fat solvents a small portion only of the fat actually present, thus showing that the butter fat globules are occluded within the protecting material that is impervious to the fat solvents.

It is to be understood that the milk powder content which I employ in my alimentary paste and which comprises a definite desirable portion of butter fat, in combination with desirable proportions of lime, whole proteins, etc., may be varied within limits to form a nutritive balance, but such limitations are well defined so that the resulting food product may not mold or become rancid. At the same time, my food product comprises a desirable nutritive ratio of which the valuable vitamin constituent known as fat soluble A is a predominant element. It will also be apparent that my invention contemplates the production of food compositions that comprise vitamin constituents known as fat soluble A in which the fat globules are so proportioned in combination with an impervious coating material, such as dough, that the fat globules are protected and prevented from deteriorating and thereby imparting rancidity to the food product.

While I have described a specific mixture which has been successfully used for macaroni, and other compositions known as alimentary pastes, it is to be understood that I do not desire to impose any limitations upon my invention except those that are specifically pointed out in the appended claims.

Having thus described my invention, what I claim as new and desire to secure by Letters Patent is:

1. Milk macaroni in which the butter fat of the milk constituent is present in such quantity as to be substantially occluded by the cereal constituent.

2. Milk macaroni comprising skim milk powder and whole milk powder in such proportion as to result in the substantial occlusion of the butter fat particles by the cereal constituent of the macaroni.

3. In a food product comprising a cereal, a whole milk powder having a fat constituent and a skim milk powder, the method of preventing rancidity in said product which consists in so proportioning and admixing the various constituents of said product that said fat constituent is substantially covered by said cereal to form a protective envelopment therefor.

4. A food product comprising substantially 96% of a cereal constituent, and a mixture of skim milk powder and whole milk powder, the proportions of said powders being such that the fat content thereof is substantially occluded by said cereal constituent.

5. Milk macaroni comprising substantially 96% of a wheat product, substantially 2% skim milk powder and substantially 2% whole milk powder in which the fat content thereof is substantially enveloped by a protective coating formed by said wheat product.

6. A food product comprising a farinaceous component, a whole milk powder, and a skim milk powder, said powders being so proportioned as to secure the maximum vitamin content, and milk protein content, and in which the fat globules thereof are substantially occluded by said farinaceous component.

7. The method of preserving a food product comprising a fat content which consists in proportioning the fat content to another constituent of the food product and incorporating the mass to secure a substantial envelopment of the fat particles by another constituent comprised in the food.

8. The method of producing a substantially homogeneous food product which possesses a percentage of fat thoroughly admixed therein which method consists in securing a substantial envelopment of the fat particles by a protective coating of another constituent comprised in said food product thereby substantially precluding rancidification of said fat.

In witness whereof, I have hereunto subscribed my name.

CARL S. MINER.